Aug. 30, 1949.   E. F. PETERSON   2,480,603
MACHINE VIBRATOR
Filed June 26, 1946

INVENTOR
E. F. PETERSON
BY
Merrill M. Blackburn
ATTORNEY

Patented Aug. 30, 1949

2,480,603

UNITED STATES PATENT OFFICE 2,480,603

MACHINE VIBRATOR

Edwin F. Peterson, Kewanee, Ill.

Application June 26, 1946, Serial No. 679,446

4 Claims. (Cl. 259—1)

My present invention relates to improvements in vibrating mechanisms and more particularly to mechanisms used in connection with molding apparatus, although the use thereof is not necessarily confined to that art. The primary purpose of this invention is to improve upon prior constructions upon which I have filed applications for patent by providing means for keeping dirt and sand from finding lodgment inside of an apparatus of the type indicated. A further object of this invention is the provision of a mode of attachment of an apparatus of the kind indicated such that the parts vibrated may be caused to move in either a vertical or a horizontal plane. My invention further resides in the combination, construction, and arrangement of parts illustrated in the accompanying drawings and, while I have shown therein what is now regarded as the preferred embodiment of this invention and a modification thereof, I desire the same to be understood as illustrative only and not to be interpreted in a limiting sense.

In the drawings annexed hereto and forming a part hereof,

Figure 1:
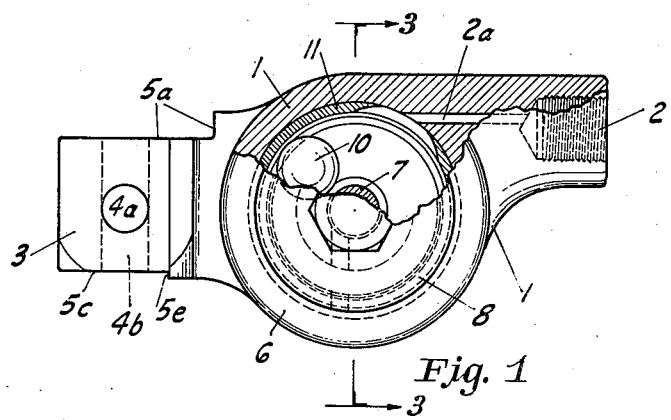
Fig. 1 represents a plan view, partly in section, of a vibrating mechanism in accordance with my invention.
Figure 2:
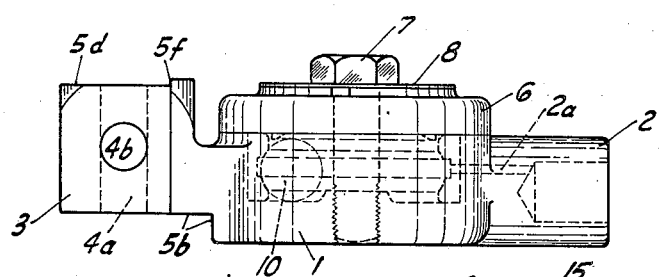
Fig. 2 represents a side elevation thereof.

Reference will now be made in greater detail to the annexed drawings for a more complete description of this invention. The body 1 has a screw-threaded opening 2 for attachment of an air hose, and this opening has an extension 2a leading to a ball raceway in the interior of the body. At the opposite side of the body 1 is an attachment lug 3 provided with two holes 4a and 4b arranged at a right angle to each other and intended to receive a bolt by means of which this mechanism is to be attached to the part to be vibrated, as, for example, a match plate. As shown at 5a and 5b, two faces of the attaching lug 3 are recessed to form an angle in which an edge of the structure upon which this vibrating mechanism is to be used may fit. If it is to be attached to a match plate, the recess 5a will be applied to the edge of the plate, and a bolt will be put through the opening 4b to fasten the vibrator to the plate so that the plate can be vibrated in a vertical direction. One the other hand, if the edge of the plate is put in the recess 5b, the securing bolt will be passed through the opening 4a and the plate, and the vibrator will then be secured to the plate in a position to cause vibration in a horizontal plane. The lug 3 may also be recessed, as shown at 5c and 5d, to form shoulders 5e and 5f against which an edge of the head of the attaching bolt may engage to prevent turning of the bolt when tightening up the nut which assists in holding the vibrator attached to the match plate or other structure.

Figure 6:
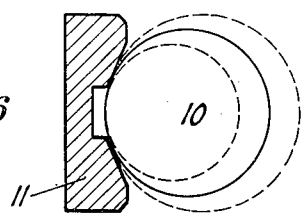
Fig. 6 represents a transverse section of an improved raceway used in this vibrating mechanism, with a metal ball shown in elevation thereon.

The body 1 is provided with a cover plate 6 which is secured in position by means of a bolt 7. A thin washer 8 is placed between the cover plate 6 and the head of the bolt 7. The opening 9 through the cover plate is larger than the shank of the bolt 7 to permit escape of air from the interior of the vibrator. This air, entering the opening 2, 2a causes a steel ball 10 to roll around on the track 11, positioned within the body 1, as shown clearly in Fig. 3. In Fig. 6, the track 11 is shown on an enlarged scale and the ball 10 is shown correspondingly enlarged. The purpose of this figure is to show that balls of various sizes may be used in a single vibrator. This is for the purpose of reducing the number of sizes of vibrators which must be manufactured and carried in stock. By changing the size of the ball used, the effect of the vibrator can be changed as required, within certain limits. Beyond these limits, vibrators of other sizes must be used, but this arrangement very materially reduces the number of sizes of vibrators required.

Figure 3:
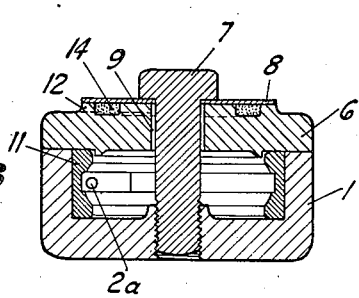
Fig. 3 represents a transverse section substantially along the plane indicated by the line 3—3, Fig. 1.
Figure 4:
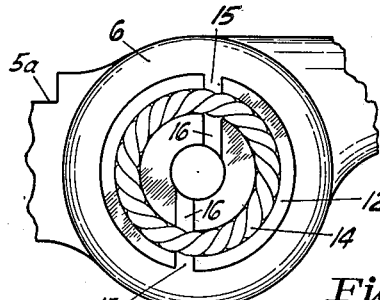
Fig. 4 represents a plan view of one form of my new mechanism with the cover plate and securing bolt removed therefrom.
Figure 5:
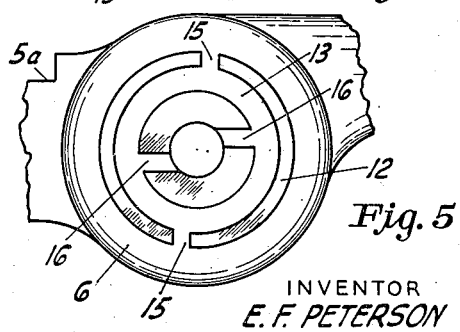
Fig. 5 represents a plan view, similar to Fig. 4, of a modified form of that construction.

As shown in Figs. 3, 4, and 5, a boss 12 is formed on the exposed face of the cover plate 6. Within this boss 12 is a circular groove 13 which may receive a packing of wool yarn 14, the purpose of which is to prevent dirt and sand from entering the grooves 15 and thereby gaining access to the interior of the vibrator. The inner sections 16 of the grooves or channels 15 may be either in alignment with the outer sections, as shown in Fig. 4, or at an angle thereto, as shown in Fig. 5. If these are formed as shown in Fig. 5, it is probably true that it will never be necessary to use the wool packing 14, as shown in Fig. 4.

It is clear that the air, entering under pressure through the opening 2, will force the ball 10 to roll around the inside of the raceway 11, and it will then escape around the bolt 7 and out through the openings 15 underneath the washer 8. Rolling of the ball 10 rapidly around the raceway will cause the body 1 to vibrate, and this vibration will be transmitted to the machine part to which the vibrator is attached.

This disclosure is, in part, a continuation of my prior application, Serial No. 620,119, filed October 3, 1945.

It will, of course be understood that the specific description of structure set forth above may be departed from without departing from the spirit of this invention as disclosed herein and as defined in the appended claims.

Having now described my invention, I claim:

1. A vibrator for the purpose indicated comprising a hollow body having one side open, a cover plate for the open side of the body, said cover plate having a boss on its outer face, said boss having a groove substantially coaxial with the hollow of the body, said body and cover plate having an opening therethrough substantially coaxial with the body opening, a headed connecting means extending therethrough to hold the parts assembled, and a washer surrounding the connecting means and located between the head of the connecting means and the boss, the hole through the cover plate being larger than the diameter of the connecting means whereby to furnish a vent from the interior of the body for air under pressure therein, a rollable body in the hollow body, the boss on the cover plate having at least one groove extending outwardly from the hole through the cover plate to allow escape of air from the interior of the body, the body having an opening for admission of air under pressure, the last mentioned opening admitting air substantially tangentially of the hollow of the body.

2. A vibrator for the purpose indicated comprising a hollow body having one side open, a cover plate for the open side of the body, said cover plate having a boss on its outer face, said boss having a groove substantially coaxial with the hollow of the body, said body and cover plate having an opening therethrough substantially coaxial with the body opening, a headed connecting means extending therethrough to hold the parts assembled, and a washer surrounding the connecting means and located between the head of the connecting means and the boss, the hole through the cover plate being larger than the diameter of the connecting means whereby to furnish a vent from the interior of the body for air under pressure therein, a rollable body in the hollow body, the boss on the cover plate having at least one groove extending outwardly from the hole through the cover plate to allow escape of air from the interior of the body, the body having an opening for admission of air under pressure, the last mentioned opening admitting air substantially tangentially of the hollow of the body, and the coaxial groove of the boss having a loose packing therein to prevent solid matter from entering the body through said outwardly extending grooves.

3. A vibrator of the character indicated having a hollow body, a ball rollable therein, a cover plate for an open side of the body, said cover plate having an opening therethrough substantially perpendicular to the body of the plate, a securing means in said opening to connect the cover plate to the body, the opening through the cover plate being somewhat larger than the connecting means to allow escape of air from the interior of the body around the securing means, the exposed face of the cover plate having grooves extending outwardly from the opening through the plate whereby to vent the air from the interior of the body, and a covering means for the grooves, said vibrator having means for conveying air under pressure to the interior of the body, the air entering in the direction of the mid-plane of the body.

4. A vibrator for the purpose indicated comprising a hollow body having one side open, a cover plate for the open side of the body, said cover plate having a boss on its outer face, said boss having a groove substantially coaxial with the hollow of the body, said body and cover plate having an opening therethrough substantially coaxial with the body opening, a headed connecting means extending therethrough to hold the parts assembled, a washer surrounding the connecting means and located between the head of the connecting means and the boss, the hole through the cover plate being larger than the diameter of the connecting means whereby to furnish a vent from the interior of the body for air under pressure therein, a rollable body in the hollow body, the boss on the cover plate having at least one groove extending outwardly from the hole through the cover plate to allow escape of air from the interior of the body, the body having an opening for admission of air under pressure, the last mentioned opening admitting air substantially tangentially of the hollow of the body, and an interiorly grooved liner fitting in the hollow body, the body and liner having an air admission opening extending substantially tangentially into the opening within the liner.

EDWIN F. PETERSON.

REFERENCES CITED

The following references are of record in the file of this patent:

UNITED STATES PATENTS

| Number | Name | Date |
| --- | --- | --- |
| 1,336,921 | Pickop | Apr. 13, 1920 |
| 1,346,221 | Liedtke | July 13, 1920 |
| 1,787,449 | Jackson | Jan. 6, 1931 |
| 2,078,983 | Thiberge | May 4, 1937 |
| 2,175,321 | Saffir | Oct. 10, 1939 |